United States Patent [19]

Merrill

[11] Patent Number: 4,753,977
[45] Date of Patent: Jun. 28, 1988

[54] WATER REPELLENT FOR MASONRY

[75] Inventor: Duane F. Merrill, Ballston Spa, N.Y.

[73] Assignee: General Electric Company, Waterford, N.Y.

[21] Appl. No.: 940,126

[22] Filed: Dec. 10, 1986

[51] Int. Cl.$^4$ .............................................. C08L 83/06
[52] U.S. Cl. .................... 524/588; 524/266; 525/477
[58] Field of Search ................ 525/477; 524/588, 266

[56] References Cited

U.S. PATENT DOCUMENTS

| | | | |
|---|---|---|---|
| 3,629,358 | 12/1971 | Lamoreaux et al. | 525/477 |
| 4,255,316 | 3/1981 | Blizzard | 525/477 |
| 4,273,813 | 6/1981 | Meddaugh | 427/387 |
| 4,486,476 | 12/1984 | Fritsch et al. | 427/387 |
| 4,490,500 | 12/1984 | Smith | 525/477 |
| 4,495,340 | 1/1985 | Blizzard et al. | 528/15 |
| 4,555,419 | 11/1985 | Huhn et al. | 427/387 |
| 4,595,610 | 6/1986 | Fey et al. | 428/319.3 |

Primary Examiner—Wilbert J. Briggs, Sr.

[57] ABSTRACT

There is provided a silicone composition for rendering surfaces stain resistant and water repellent comprising:
(a) an organopolysiloxane resin selected from the group consisting of resins having $R_3SiO_{0.5}$ units and $SiO_2$ units, the ratio of $R_3SiO_{0.5}$ units to $SiO_2$ units, ranging from about 0.2 to about 0.9:1 and resins having $R_3SiO_{0.5}$ units, $R_2SiO$ units, and $SiO_2$ units, the ratio of $R_3SiO_{0.5}$ units to $SiO_2$ ranging from about 0.2 to about 0.9:1 and the ratio of $R_2SiO$ units to $SiO_2$ units being up to about 0.1:1 where each R is independently selected from substituted or unsubstituted hydrocarbon radical of from 1 to 8 carbon atoms;
(b) alkyl-alkoxypolysiloxane resin; and
(c) an effective amount of condensation catalyst.

13 Claims, No Drawings

WATER REPELLENT FOR MASONRY

BACKGROUND OF THE INVENTION

The present invention generally relates to the treatment of porous and non porous materials in order to render them water repellent and stain resistant. More particularly, the present invention relates to silicone compositions suitable for rendering stainless steel, aluminum, glass, ceramic and masonry such as brick, concrete, stone, mortar, tile, cinder block, stucco and the like water repellent and stain resistant.

Silicones have been used to render surfaces water repellent and stain resistant for many years. The heretofore employed silicones have met with considerable commercial success and are used on all types of surfaces. However, these silicones tended to leave the surface somewhat tacky and hence caused dirt to adhere thereto. Additionally, many of the previously employed silicones did not maintain excellent water repellency after prolonged exposure to weather. Finally, the stain resistance of these materials was imperfect, in many instances providing for only partial removal of stains.

U.S. Pat. No. 2,412,470 discloses a process for treating a solid body to render it water repellent which comprises contacting said body with a composition containing, as the active ingredient thereof, a mixture consisting essentially of from about 2.8 to about 99.2 weight percent trimethyl silicon chloride and from about 97.2 to 0.8 weight percent silicon tetrachloride.

U.S. Pat. No. 2,574,168 provides a process for rendering porous masonry structures water repellent by applying to such masonry structures a dilute liquid comprising an organic solvent solution of a silicone resin in its B-staged partially condensed form, wherein the concentration of the silicone resin is from about 0.1 to 5 parts by weight, said silicone resin when completely condensed being a heterocyclic and crosslinked condensation product having the formula $(R_mSiO_n)_x$, where x is an integer greater than one, R represents monovalent alkyl or aryl radicals, m is a number less than two but not less than 0.5, and n is a number more than one and not less than about 1.75, the silicon atoms in the resin being linked to the oxygen atoms and the alkyl and aryl radicals being attached to silicon atoms.

U.S. Pat. No. 2,672,455 provides a water repellent for leather which comprises (1) 15 to 50 percent by weight of a titanium compound selected from the group consisting of titanium compounds having the general formula $Ti(OR)_4$ and aliphatic hydrocarbon soluble partial hydrolyzates thereof in which R is an aliphatic hydrocarbon radical or hydroxylated aliphatic hydrocarbon radical, (2) 15 to 70 percent by weight of a methylpolysiloxane copolymer composed of trimethylsiloxane units and $SiO_2$ units, said units being in such proportion that the ratio of methyl radicals to silicon atoms is from 1.0 to 2.5:1, and (3) 15 to 80 percent by weight of a polysiloxane having the general formula $R'_n SiO_{(4-n)/2}$, where R' is a $C_{1-4}$ alkyl or alkylene radical or a monocyclic aryl radical, and n having an average value of 2 to 2.9, each silicon atom in polysiloxane (3) having at least one R' radical attached thereto.

U.S. Pat. No. 2,678,893 teaches a method for rendering leather weather repellent comprising contacting the leather with a solution of a methylpolysiloxane composed of trimethylsiloxane units and $SiO_2$ units in such proportion that the ratio of methyl radicals to silicon atoms is from 1 to 2.5, said solution containing from 1 to 50 percent by weight of the methylpolysiloxane.

U.S. Pat. No. 2,735,791 relates to a waterproofing composition suitable for application to fibrous organic materials which comprises an aqueous emulsion containing 20 to 60 weight percent, as solids, of a methyl polysiloxanic resin having a $CH_3$ to Si ratio between 1.3:1 and 1.7:1; 20 to 50 weight percent of a methyl polysiloxanic oil havng a $CH_3$ to Si ratio between 1.9:1 and 2.1:1; and from 8 to 40 weight percent triethanolamine titanate.

U.S. Pat. No. 2,928,798 discloses compositions useful for rendering porous materials water repellent which comprise, by weight, (1) from 10 to 60 percent of a titanium compound selected from the group consisting of (a) orthotitanates having the general formula $Ti(OR)_4$, where R is an aliphatic hydrocarbon radical or an aminated or hydroxylated aliphatic hydrocarbon radical, and (b) aliphatic hydrocarbon soluble partial hydrolyzates of (a); (2) from 25 to 75 percent of a methylsiloxane copolymer containing trimethylsiloxy units and $SiO_2$ units, wherein the ratio of methyl groups to silicon atoms ranges from about 1 to 1.25, and (3) from 10 to 50 percent of a fluid organopolysiloxane having the formula $R'_nSiO_{(4-n)/2}$, where R' represents both lower alkyl radicals and chlorinated phenyl radicals containing an average of 3 to 5 chlorine atoms per phenyl nucleus, the chlorinated phenyl radicals constituting from 5 to 25 percent of the total number of R' radicals, n has an average value between 1.96 and 2.5, and the viscosity is from 10 centistokes to 100,000 centistokes at 25° C.

U.S. Pat. App. Ser. No. 945,584, filed Dec. 23, 1986, now U.S. Pat. No. 4,717,599, of the instant inventor and copending herewith describes a silicone composition for rendering masonry water repellent and stain resistant. The silicone composition comprises an MQ resin and an alkyl-alkoxypolysiloxane in a solvent carrier. The composition when applied provides for excellent water repellency but the anti-staining aspect is not at levels which the marketplace demands.

It is an object of the present invention to provide a composition to render porous and non-porous surfaces both water repellent and stain resistant.

It is another object of the present invention to provide a water repellent and stain resistant material for porous and non-porous substrates which cures to a dry, non-tacky material but yet is solvent soluble.

SUMMARY OF THE INVENTION

Briefly, according to the present invention, there is provided an anti-stain composition for application to both porous and non-porous materials comprising:

(a) 100 parts by weight an organopolysiloxane resin selected from the group consisting of resins having $R_3SiO_{0.5}$ units and $SiO_2$ units, the ratio of $R_3SiO_{0.5}$ to $SiO_2$ ranging from about 0.2 to about 0.9:1 (e.g. MQ resins), and resins having $R_3SiO_{0.5}$ units, $R_2SiO$ units, and $SiO_2$ units, the ratio of $R_3SiO_{0.5}$ units to $SiO_2$ ranging from about 0.2 to about 0.9:1 and the ratio of $R_2SiO$ units to $SiO_2$ units being up to about 0.1:1 (e.g. MDQ resins), where each R is independently selected from substituted or unsubstituted monovalent hydrocarbon radicals from 1 to about 8 carbon atoms;

(b) 5 to 500 parts by weight an alkylalkoxypolysiloxane resin;

(c) an effective amount of condensation catalyst.

Optionally, there may be included within this composition an alkoxy crosslinking agent.

DESCRIPTION OF THE INVENTION

Suitable organopolysiloxane resin for use herein is selected from the group consisting of resins containing $R_3SiO_{0.5}$ units and $SiO_2$ units, the ratio of $R_3SiO_{0.5}$ to $SiO_2$ ranging from about 0.2 to about 0.9:1 and resins containing $R_3SiO_{0.5}$ units, $R_2SiO$ units, and $SiO_2$ units, the ratio of $R_3SiO_{0.5}$ units to $SiO_2$ ranging from about 0.2 to about 0.9:1 and the ratio of $R_2SiO$ units to $SiO_2$ units being up to about 0.1:1; where each R is a substituted or unsubstituted monovalent hydrocarbon radical from 1 to about 8 carbon atoms, including alkyl radicals, aryl radicals, alkaryl radicals, aralkyl radicals, cycloalkyl radicals, or alkenyl radicals. Preferably all of the R groups are methyl.

Methods for preparing such organopolysiloxane resins are well known in the art, for example, as described in U.S. Pat. No. 2,398,672 to Sauer, U.S. Pat. No. 2,676,182 to Daudt et al., U.S. Pat. No. 2,736,721 to Dexter, and U.S. Pat. No. 2,857,356 to Goodwin, Jr., all of which are incorporated by reference into the present disclosure. Other methods for preparing resins of this type will be apparent to those of ordinary skill in the art.

These resins generally are hydroxy substituted due to the fact that unreacted hydroxy remains following condensation of silanols in their manufacture. Of course, the hydroxy substitution could easily be alkoxy substitution which would also be suitable for use herein. Degree of condensation or molecular weight is usually determinative of hydroxy or alkoxy content. It is preferred that the organopolysiloxane resins have a hydroxy or alkoxy content ranging from about 1 to about 6% by weight.

Alkyl-alkoxypolysiloxane resins contemplated for use in the present invention contain units of the general formula:

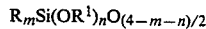

$$R_mSi(OR^1)_nO_{(4-m-n)/2}$$

where m is 0, 1 or 2; n is 1, 2 or 3; m+n is 1, 2 or 3; $R^1$ is a substituted or unsubstituted condensable hydrocarbon radical of from 1 to 6 carbon atoms, preferably methyl; R is a substituted or unsubstituted monovalent hydrocarbon radical of from 1 to 8 carbon atoms preferably methyl; and fewer than 20% by number of all siloxane units are $SiO_2$ units.

The alkyl-alkoxypolysiloxane resins may be produced as an alkoxy resin, i.e. through the condensation of alkoxy substituted silanes, or such resins may be produced as hydroxy substituted polymers and capped with an alkoxy substituted silane. Well known capping silanes are methyltrimethoxysilane, methyltriethoxysilane, ethyltrimethoxysilane, tetraethoxysilane, vinyltrimethoxysilane, etc. The uses of these capping silanes are well known, such as found in U.S. Pat. No. 4,515,932 and others, hereby incorporated by reference.

A preferred alkyl-alkoxypolysiloxane is a predominantly linear silicone polymer having terminal alkoxy groups. This linear polymer may be represented by the formula:

$$(R^1O)_nR_{(3-n)}SiO[R_mSiO]_xSiR_{(3-n)}(OR^1)_n$$

where m is about 2, n is 2, or 3, x is at least 7 and R and $R^1$ are defined above. Such linear silicone polymers are disclosed in U.S. Pat. No. 3,161,614, Brown, et al., hereby incorporated by reference. These alkyl alkoxypolysiloxanes are well known in the art and manufactured by well known methods.

Preferred alkyl-alkoxypolysiloxanes are non-linear and have the empirical formula:

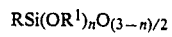

$$RSi(OR^1)_nO_{(3-n)/2}$$

wherein n is a number from about ⅓ to about 1 and R and $R^1$ are defined above. Where n is slightly more than 1, some organopolysiloxane units will be in the form of rings and some in the form of chains. Where n is exactly 1, the organopolysiloxane units will be in a ring containing six or more members. Where n is less than 1, the organopolysiloxane units will be in the form of rings or chains of rings. These alkoxypolysiloxanes are oils which show little viscosity change with moderate heating. Preferably R is methyl. Suitable non-linear alkyl-alkoxypolysiloxanes are described in U.S. Pat. No. 2,624,749 to Bunnell and U.S. Pat. No. 2,810,704 to Krantz, both of which are incorporated by reference. Methylmethoxypolysiloxane resins of Krantz, are available from General Electric Company under the trademark DF 104. Other suitable alkyl-alkoxypolysiloxane resins will be obvious to the artisan or their suitability can be ascertained without undue experimentation.

For each 100 parts by weight organopolysiloxane resin, there should be used from about 5 to about 500 parts by weight alkyl-alkoxypolysiloxane and preferably about 5 to about 100 parts by weight. Whether the alkyl-alkoxypolysiloxane is linear or non-linear, viscosity should vary between about 10 and 10,000 centipoise at 25° C. Preferably viscosity should vary between about 50 and 1000 centipoise.

The condensation catalyst used herein may be a Lewis acid; a primary, secondary, or tertiary organic amine; a combination of Lewis acid and organic amine; a metal oxide; titanium compounds; tin compounds; or zirconium compounds. These catalysts will facilitate the condensation reaction of hydroxy with hydroxy, hydroxy with methoxy, or methoxy with methoxy and thus promote cure.

Suitable titanium compounds include, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition, betadicarbonyltitanium compounds as shown by Weyenberg, U.S. Pat. No. 3,334,067 can be used as condensation catalysts in the present invention.

Suitable tin compounds are, for example, dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin di-neodeconoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindiacetate is particularly preferred.

Zirconium compounds are exemplified by zirconium octoate. Further examples of metal condensation catalysts are, for example, lead 2-ethyloctoate, iron 2-ethyloctoate, cobalt 2-ethyloctoate, antimony octoate, bismuth naphthenate, zinc napthenate, zinc sterate and certain metal oxides.

The above titanium, tin, zirconium, and other metal condensation catalysts should be added in concentrations of from about 0.001 to 2 parts by weight metal to 100 parts by weight of organopolysiloxane resin and alkyl-alkoxypolysiloxane. To be best effective, such catalysts should be in a form to render them silicone soluble.

By broad definition, Lewis acids include Lowry-Bronsted acids and are considered to be any compound which is an electron acceptor. Specifically, Lewis acids are anhydrides, such as, acetic anhydride, propionic anhydride, butyric anhydride, etc.; acetyl silanes, such as, methyltriacetylsilane, ethyltriacetylsilane, dimethyldiacetylsilane, etc.; organic acids, such as, formic acid, acetic acid, propionic acid, butyric acid, succinic acid, trichloroacetic acid, etc.; inorganic acids, such as, hydrochloric acid, sulfuric acid, phosphoric acid, nitric acid, iodic acid, etc.; and more traditional Lewis acids, such as, aluminum trichloride, barium sulfate, boron tribromide, iron chloride, etc.

Suitable amine compounds are primary, secondary, or tertiary amines which may be silylated or otherwise complexed. The more basic the amine, the more effective it is as a catalyst. Examples of preferred amines that can be used within the scope of the instant invention are for instance:

$(Me_2N)_2-C=NC_3H_7Si(OCH_3)_3$
$(Me_2N)_2-C=NC_4H_9$
$H_2NC_3H_7Si(OEt)_3$
$H_2NC_3H_7Si(OCH_3)_3$
$H_2NC_3H_7NC_3H_7Si(OCH_3)_3$
Tetramethylpiperidine
Piperidine
1,4-Diazabicyclo[2.2.2]octane
N-Methylmorpholine
N,N-Dimethylethylenediamine
N-Methylpiperidine
N-hexylamine
Tributylamine
Dibutylamine
Cyclohexylamine
Di-n-hexylamine
Triethylamine
Benzylamine
Dipropylamine
N-ethylphenylamine The amine catalyst may be integrated with the aforementioned capping silanes or the below mentioned crosslinking agents to produce an integrated crosslinking catalyst. An example of such a dual purpose compound is gamma-aminopropyltrimethoxysilane.

Combinations of Lewis acids and amines provide a synergistic effect and thus are particularly desirable. Lewis acids and amines are effective catalysts when present anywhere from about 0.1 parts by weight to about 10 parts by weight to 100 parts by weight polyorganosiloxane resin and alkyl-alkoxypolysiloxane.

Within the previously set forth weight ranges it is essential to the present invention that sufficient alkylalkoxypolysiloxane be added to the organopolysiloxane resin that a film is formed on a surface to which the mixture is applied. Generally, the organopolysiloxane resin will dry to a powder but in combination with sufficient alkyl-alkoxypolysiloxane resin, a continuous surface film will form.

Given that sufficient alkyl-alkoxypolysiloxane is present to form a surface film, there should be sufficient alkoxy present with catalysts to crosslink the film to a dry, tack free surface but not so much alkoxy present the film is overcured. The alkoxy is, of course, present in the alkyl-alkoxypolysiloxane or polyorganosiloxane resin, and the catalyst will crosslink these sites to cure the film. Where there is insufficient alkoxy present, further alkoxy may be supplied in mixture by adding from about 1 to about 15 parts by weight to 100 parts by weight polyorganosiloxane resin and alkyl-alkoxypolysiloxane, crosslinking agents which are the capping silanes discussed above. It is essential to the present invention that the film not be cured or curable to the point that it is no longer soluble in common organic solvents such as xylene, toluene, or mineral spirits. It is essential to the coating of the present invention that the surface be removable with only brief exposure to common organic solvents. Thus, where a catalyst is employed that is "too hot" or does not migrate from the film and the composition contains a substantial amount of unreacted alkoxy functionality, the coating will over cure and lose its anti-staining effect. Persons skilled in the art are able to judge to what degree the composition should be cured and the various factors which control cure to obtain a film of the appropriate characteristics.

The compositions of the present invention may be applied as a solution in an organic solvent such as xylene or toluene, at from about 5 to about 60% by weight solids. Means of application include brushing, spraying, and the like.

Where the surface is porous, for example masonry such as brick, concrete, cinder block, mortar, tile, stone, stucco, sandstone, limestone, and equivalent materials, the composition should be applied at low solids in order to facilitate penetration of the surface. Generally, application to such surfaces should be performed at about 5 to about 20 percent by weight solids.

Where the surface is non-porous, such as, for example, stainless steel, aluminum, glass, ceramic and the like, the composition should be applied at higher solids to prevent running. Generally application to such surfaces should be performed at about 5 to about 20 percent by weight solids.

Where the surface is non-porous, such as, for example, stainless steel, aluminum, glass, ceramic and the like, the composition should be applied at higher solids to prevent running. Generally application to such surfaces should be performed at about 40 to about 60 percent by weights solids.

In order to better enable the artisan to practice the present invention, the following examples are provided by way of illustration and not by way of limitation. All parts and percentages are by weight unless otherwise noted.

EXAMPLES

Example 1

Alkyl-alkoxypolysiloxane resin is prepared having the formula:

$$CH_3Si(OCH_3)_nO_{(3-n)/2}$$

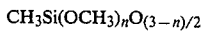

by treating methyltrichlorosilane in the absence of water and in the presence of a water insoluble inert solvent with methanol in an amount equal to from 1 to less than 3 moles methanol per mole of methyltrichlorosilane, the byproduct HCl being retained in the reaction mixture. The alkoxylated silane is subsequently hydrolyzed by adding a mixture of methanol and water in which the water is present in an amount equal to from 1.15 to 1.33 moles per mole of methyltrichlorosilane originally used and the amount of methanol being from 25 to 75% of the total amount of total methanol added. Following hydrolysis, the silane is allowed to condense in the presence of the hydrogen chloride dissolved in the reaction mixture. The resultant resin is isolated from the liquid system and has a value of n equal to from ⅓ to 7/10. Residual HCl is present in an unknown amount.

Example 2

70 parts by weight organopolysiloxane resin, at 60% solids in xylene, composed of $(CH_3)_3 SiO_{0.5}$ units and $SiO_2$ units in a ratio of 0.8:1 was combined with 30 parts by weight alkyl-alkoxypolysiloxane of Example 1. The resulting mixture was reduced to 10% solids in mineral spirits.

Examples 3-13

Crosslinking agents and catalyst were added to the composition of Example 2 as shown in Table 1 below. A first coat of this composition was applied by brush to white Danbuy marble, allowed to dry one hour, and a second coat applied and allowed to stand and cure at room temperature for 24 hours. Subsequently, a heavy marking was applied to the coated face of each white marble sample using a permanent black marker and allowed to dry 5 minutes. Removal of the marking from the face of each sample was attempted using a toluene wipe. Percentages are based on silicone solids.

TABLE 1

| Example | Catalyst | Crosslinking agent | Marking after toluene wipe |
| --- | --- | --- | --- |
| 3 | — | — | light shadow |
| 4 | 4% dibutylamine-acetate | — | complete removal |
| 5 | 4% dibutylamine | — | complete removal |
| 6 | residual HCl | 4% methyltri-methoxysilane | complete removal |
| 7 | 1% triethanolamine | — | light shadow |
| 8 | 1% tetrabutyl | — | light shadow |
| 9 | tin octoate - 1% tin | — | light shadow |
| 10 | lead octoate - 1% lead | — | light shadow |
| 11 | zinc octoate - 1% zinc | — | light shadow |
| 12 | 6% gamma-aminopropyl-triethoxysilane | — | complete removal |
| 13 | 1% gamma-aminopropyl-triethoxysilane | — | complete removal |

Examples 14-16

6% by weight gamma-aminopropyltriethoxysilane was added to the composition of Example 2 as shown in Table 2 below. A single coat of this composition was applied by brush to the substrate shown and allowed to stand and cure at room temperature for 24 hours. Subsequently, a heavy marking was applied to the coated face of each substrate using a permanent black marker and allowed to dry 5 minutes. Removal of the marking from the face of each sample was attempted using a toluene wipe.

TABLE 2

| Example | Substrate | Marking after toluene wipe no coating | Marking after toluene wipe with coating |
| --- | --- | --- | --- |
| 14 | aluminum | light shadow | complete removal |
| 15 | stainless steel | complete removal | complete removal |
| 16 | glass | complete removal | complete removal |

What is claimed is:

1. A composition of matter comprising:
   (a) organopolysiloxane resin selected from the group consisting of resins having $R_3SiO_{0.5}$ units and $SiO_2$ units, the ratio of $R_3SiO_{0.5}$ units to $SiO_2$ units, ranging from about 0.2 to about 0.9:1 and resins having $R_3SiO_{0.5}$ units, $R_2SiO$ units, and $SiO_2$ units, the ratio of $R_3SiO_{0.5}$ units to $SiO_2$ ranging from about 0.2 to about 0.9:1 and the ratio of $R_2SiO$ units to $SiO_2$ units being up to about 0.1:1 where each R is a substituted or unsubstituted monovalent hydrocarbon radicals from 1 to about 8 carbon atoms;
   (b) 5 to 500 parts by weight alkyl-alkoxypolysiloxane resin for each 100 parts by weight organopolysiloxane resin said alkyl-alkoxypolysiloxane having the empirical formula:

$$RSi(OR^1)_nO_{(3-n)/2}$$

wherein n is a number from about ⅓ to about 1 and $R^1$ is a substituted or unsubstituted condensable hydrocarbon radical of from 1 to 6 carbon atoms and R is a substituted or unsubstituted hydrocarbon radical of from 1 to 8 carbon atoms; and
   (c) an effective amount of condensation catalyst.

2. The composition of claim 1 which further contains from about 1 to about 15 parts by weight of crosslinking agent to 100 parts by weight polyorganosiloxane resin and alkyl-alkoxypolysiloxane.

3. The composition of claim 2 wherein said crosslinking agent is methyl trimethoxy silane.

4. The composition of claim 2 wherein said crosslinking agent and said catalyst is gamma-aminopropyltrimethoxysilane.

5. The composition of claim 1 wherein there is from about 5 to about 100 parts by weight alkyl-alkoxypolysiloxane for each 100 parts by weight organopolysiloxane resin.

6. The composition of claim 1 which further contains sufficient organic solvent to form a solution of from about 5 to about 60% by weight solids.

7. The composition of claim 1 wherein R and $R^1$ are methyl.

8. The composition of claim 1 wherein said organopolysiloxane resin has a hydroxy or alkoxy content ranging from about 1 to about 6% by weight.

9. The composition of claim 1 wherein said condensation catalyst is selected from the group consisting of a Lewis acid, an organic amine, a combination of Lewis acid and organic amine, metal oxide, titanium compounds, tin compounds, and zirconium compounds.

10. The composition of claim 9 wherein said condensation catalyst is an organic amine.

11. A composition of matter comprising:
    (a) organopolysiloxane resin selected from the group consisting of resins having $R_3SiO_{0.5}$ units and $SiO_2$ units, the ratio of $R_3SiO_{0.5}$ units to $SiO_2$ units, ranging from about 0.2 to about 0.9:1 and resins having $R_3SiO_{0.5}$ units, $R_2SiO$ units, and $SiO_2$ units, the ratio of $R_3SiO_{0.5}$ units to $SiO_2$ ranging from about 0.2 to about 0.9:1 and the ratio of $R_2SiO$ units to SiO$_2$ units being up to about 0.1:1 where each R is a substituted or unsubstituted monovalent hydrocarbon radical of from 1 to 8 carbon atoms;

(b) sufficient alkyl-alkoxypolysiloxane resin that the composition forms a film and is curable to a dry, tack-free composition but not so much that the composition is curable to insolubility in mineral spirits said alkyl-alkoxypolysiloxane having the empirical formula:

$$RSi(OR^1)_n O_{(3-n)/2}$$

wherein n is a number from about ⅓ to about 1 and R$^1$ is a substituted or unsubstituted condensable hydrocarbon radical of from 1 to 6 carbon atoms and R is a substituted or unsubstituted hydrocarbon radical of from 1 to 8 carbon atoms; and (c) an effective amount of condensation catalyst.

12. The composition of claim 11 which additionally contains a crosslinking agent in an amount of from about 1 to about 15 parts by weight to 100 parts by weight polyorganosiloxane resin and alkyl-alkoxypolysiloxane.

13. A method for rendering surfaces stain resistant and water repellent comprising the steps of:

(I) applying a composition comprising:
    (a) organopolysiloxane resin selected from the group consisting of resins having R$_3$SiO$_{0.5}$ units and SiO$_2$ units, the ratio of R$_3$SiO$_{0.5}$ units to SiO$_2$ units, ranging from about 0.2 to about 0.9:1 and resins having R$_3$SiO$_{0.5}$ units, R$_2$SiO units, and SiO$_2$ units, the ratio of R$_3$SiO$_{0.5}$ units to SiO$_2$ ranging from about 0.2 to about 0.9:1 and the ratio of R$_2$SiO units to SiO$_2$ units being up to about 0.1:1 where each R is a substituted or unsubstituted monovalent hydrocarbon radical of from 1 to 8 carbon atoms;

(b) 5 to 500 parts by weight an alkyl-alkoxypolysiloxane resin for each 100 parts by weight organopolysiloxane resin, said alkyl-alkoxypolysiloxane having the empirical formula:

$$RSi(OR^1)_n O_{(3-n)/2}$$

wherein n is a number from about ⅓ to about 1 and R$^1$ is a substituted or unsubstituted condensable hydrocarbon radical of from 1 to 6 carbon atoms and R is a substituted or unsubstituted hydrocarbon radical of from 1 to 8 carbon atoms; and (c) an effective amount of condensation catalyst; and (d) sufficient organic solvent to form a solution at from about 5 to about 60% by weight solids; and II. evaporating the solvent.

* * * * *